(12) United States Patent
Kim et al.

(10) Patent No.: US 11,407,309 B2
(45) Date of Patent: Aug. 9, 2022

(54) VEHICLE CONTROLLING APPARATUS AND VEHICLE HAVING THE SAME

(71) Applicant: LG Electronics Inc., Seoul (KR)

(72) Inventors: Hyongguk Kim, Seoul (KR); Hyeongjin Im, Seoul (KR); Chiwon Song, Seoul (KR); Jaehoon Cho, Seoul (KR); Heejeong Heo, Seoul (KR); Yoonjung Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 369 days.

(21) Appl. No.: 16/490,499

(22) PCT Filed: Jul. 1, 2019

(86) PCT No.: PCT/KR2019/007965
§ 371 (c)(1),
(2) Date: Aug. 30, 2019

(87) PCT Pub. No.: WO2021/002487
PCT Pub. Date: Jan. 7, 2021

(65) Prior Publication Data
US 2021/0354559 A1 Nov. 18, 2021

(51) Int. Cl.
*B60K 35/00* (2006.01)
*G06F 3/041* (2006.01)
(Continued)

(52) U.S. Cl.
CPC .............. *B60K 35/00* (2013.01); *G06F 3/013* (2013.01); *G06F 3/04162* (2019.05);
(Continued)

(58) Field of Classification Search
CPC .............. B60K 35/00; B60K 2370/349; B60K 2370/152; B60K 2370/182;
(Continued)

(56) References Cited

U.S. PATENT DOCUMENTS 10,528,132 B1 * 1/2020 Hassani .................. G06F 3/013
10,809,801 B1 * 10/2020 Weng ...................... G06F 3/147
(Continued)

FOREIGN PATENT DOCUMENTS

JP           11005488       1/1999
JP         2007145310       6/2007
(Continued)

OTHER PUBLICATIONS

PCT International Search Report in International Application No. PCT/KR2019/007965, dated Apr. 1, 2020, 22 pages (with English translation).

*Primary Examiner* — Christopher E Leiby
(74) *Attorney, Agent, or Firm* — Fish & Richardson P.C.

(57) ABSTRACT

Disclosed is a vehicle controlling apparatus for controlling a vehicle having a display. The vehicle controlling apparatus includes: a communication unit configured to communicate with the display; and a processor configured to set at least one region among an entire region of the display as a display region, based on a sight line range changed according to a position of a passenger who got on the vehicle, and configured to control the communication unit so that visual information is displayed on the display region.

18 Claims, 15 Drawing Sheets

(51) Int. Cl.
*G06F 3/01* (2006.01)
*G06F 3/04883* (2022.01)
*G06F 3/042* (2006.01)

(52) U.S. Cl.
CPC .... *G06F 3/04883* (2013.01); *B60K 2370/152* (2019.05); *B60K 2370/182* (2019.05); *B60K 2370/349* (2019.05); *B60K 2370/52* (2019.05); *B60K 2370/73* (2019.05); *G06F 3/042* (2013.01); *G06F 2203/04808* (2013.01)

(58) Field of Classification Search
CPC ............ B60K 2370/73; B60K 2370/52; G06F 3/04162; G06F 3/013; G06F 3/04883; G06F 3/042; G06F 2203/04808
See application file for complete search history.

(56) References Cited

U.S. PATENT DOCUMENTS

| | | | |
|---|---|---|---|
| 2002/0067366 A1* | 6/2002 | Hirao | B60K 35/00 345/660 |
| 2009/0167682 A1* | 7/2009 | Yamashita | G06F 3/03547 345/158 |
| 2009/0256813 A1* | 10/2009 | Amici | B60K 35/00 345/173 |
| 2010/0238280 A1* | 9/2010 | Ishii | B60K 37/06 348/77 |
| 2010/0277438 A1* | 11/2010 | Kawashima | G06F 3/0426 345/175 |
| 2013/0097557 A1* | 4/2013 | Madau | G06K 9/00845 715/810 |
| 2015/0100910 A1* | 4/2015 | Luo | G06F 3/04886 715/771 |
| 2016/0282940 A1* | 9/2016 | Hong | G02B 27/0101 |
| 2016/0355133 A1* | 12/2016 | Kim | H04N 7/181 |
| 2018/0232195 A1* | 8/2018 | Jaegal | G06F 3/14 |
| 2018/0265002 A1* | 9/2018 | Kawamoto | H04N 5/23238 |
| 2019/0135199 A1* | 5/2019 | Galan Garcia | H03K 17/975 |
| 2020/0110463 A1* | 4/2020 | Kawamura | G06F 3/013 |
| 2020/0139814 A1* | 5/2020 | Galan Garcia | B32B 27/065 |

FOREIGN PATENT DOCUMENTS

| | | |
|---|---|---|
| JP | 2014225728 | 12/2014 |
| JP | 2016004541 | 1/2016 |
| KR | 20190004606 | 1/2019 |

* cited by examiner

VEHICLE CONTROLLING APPARATUS AND VEHICLE HAVING THE SAME

CROSS-REFERENCE TO RELATED APPLICATION

This application is the National Stage filing under 35 U.S.C. 371 of International Application No. PCT/KR2019/007965 filed on Jul. 1, 2019, which is incorporated by reference.

TECHNICAL FIELD

The present invention relates to a vehicle controlling apparatus mounted to a vehicle and capable of performing communication with other devices provided at the vehicle, and a vehicle having the same.

BACKGROUND ART

A vehicle refers to means of transporting people or goods by using kinetic energy. Representative examples of vehicles include automobiles and motorcycles.

For safety and convenience of a user who uses the vehicle, various sensors and devices are provided in the vehicle, and functions of the vehicle are diversified.

The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

A vehicle is provided with one or more displays for at least one passenger who was on board. Further, as the vehicle becomes multifunctional, various driving information is provided through the display. As the display is changed into a device for interacting with a user from a mere information transmitting device, it is required to develop a user interface to control the display inside the vehicle.

Recently, an autonomous driving vehicle which can move autonomously without a driver is being developed. The autonomous driving vehicle should provide various types of self-autonomous driving according to a driving environment where a vehicle is moving, because it is directly related to a passenger's safety and convenience.

DISCLOSURE

Technical Problem

The present invention is to solve the aforementioned problems and other problems.

As an autonomous driving is introduced, a large-screen display is arranged in a vehicle. The present invention is to provide a vehicle controlling apparatus capable of providing various interactions by utilizing such a large-screen display, and a control method thereof.

Technical Solution

The present invention provides a vehicle controlling apparatus for controlling a vehicle having a display.

The vehicle controlling apparatus for controlling a vehicle having a display, comprises: a communication unit configured to communicate with the display; and a processor configured to set at least one region among an entire region of the display as a display region, based on a sight line range changed according to a position of a passenger who got on the vehicle, and configured to control the communication unit so that visual information is displayed on the display region.

In an embodiment, a plurality of screens spaced apart from each other may be displayed on the display region. And the processor may select one screen as a main screen based on the passenger's sight line, and may execute a predetermined function with respect to the main screen.

In an embodiment, the processor may control the communication unit to perform a local dimming for making the main screen brighter than other screens.

In an embodiment, the processor may determine a maximum size of the main screen by considering the plurality of screens, and may control the communication unit so that the main screen is enlarged to the maximum size.

In an embodiment, the maximum size may be changed according to a distance between the passenger and the display.

In an embodiment, the processor may determine at least one of a display position and a display size of each screen, based on a priority of said each screen.

In an embodiment, the processor may update the priority of each screen based on the passenger's sight line.

In an embodiment, the plurality of screens may be sequentially arranged on the display region from one end towards another end, in order of a higher priority.

In an embodiment, the one end may be variable according to a position of the passenger who got on the vehicle.

In an embodiment, the sight line range may be determined by at least one of a head position, a face direction, and a sight line of the passenger.

In an embodiment, the processor may determine the number of contents to be displayed on the display region based on the sight line range, and may control the communication unit so that the determined number of contents are displayed on the display region.

In an embodiment, the number of contents to be displayed on the display region may be increased when a distance between the passenger and the display is long.

In an embodiment, the processor may control the communication unit so that visual information is not displayed on a remaining region except for the display region, among the entire region of the display.

In an embodiment, the display region may be turned on, and the remaining region may be turned off.

In an embodiment, the display region may be real-time changed according to the sight line range.

In an embodiment, if a first passenger and a second passenger are in the vehicle, the processor may set a first display region corresponding to the first passenger, and a second display region corresponding to the second passenger.

In an embodiment, if the second passenger views the first display region, the processor may control the communication unit so that contents displayed on the first display region are displayed on the second display region.

In an embodiment, a sub display configured to receive a user's input for controlling the display may be further provided at the vehicle. In response to the passenger's hand positioned on the sub display, the processor may control the communication unit so that a plurality of graphic objects are displayed on the sub display.

In an embodiment, a display position of the graphic objects may be changed according to a position of the hand.

In an embodiment, the processor may control the communication unit so that a first graphic object is displayed on a region where the passenger's index finger is positioned, and a second graphic object is displayed on a region where the passenger's middle finger is positioned, among an entire region of the sub display.

Advantageous Effect

The present invention according to embodiments may have the following one or more effects.

In an embodiment of the present invention, a passenger may be provided with various interactions, through the large-screen display mounted in the vehicle. Further, the vehicle controlling apparatus according to the present invention may provide a customized user interface with consideration of a passenger's sight line range.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
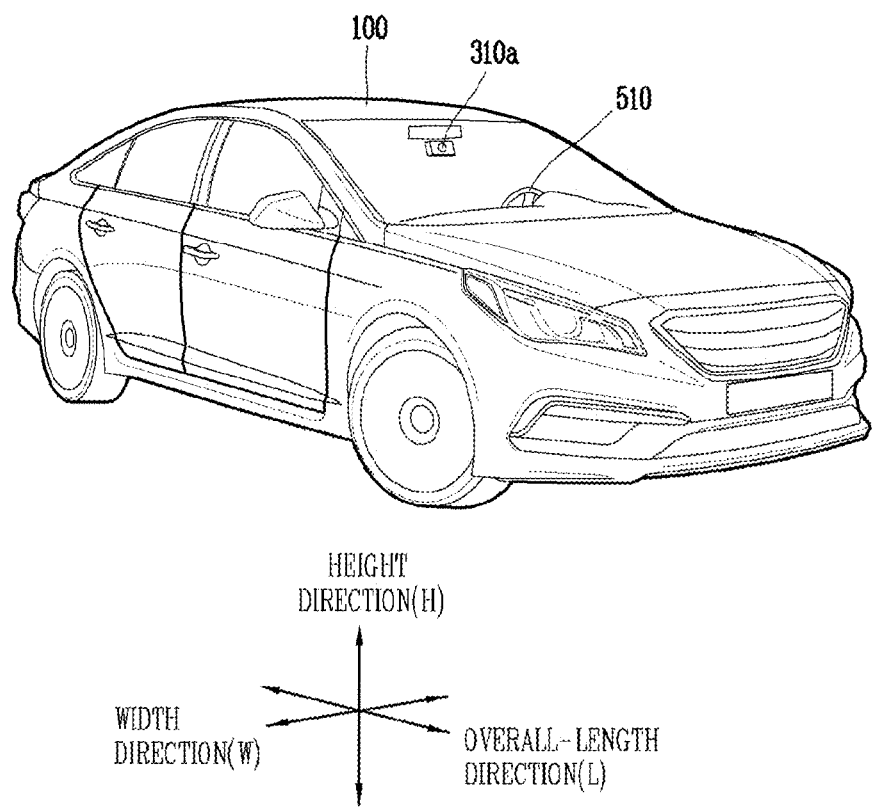
FIG. 1 is a view showing the appearance of a vehicle according to an embodiment of the present invention.

FIG. 1 is a view illustrating appearance of a vehicle in accordance with an embodiment of the present invention.

Figure 2:
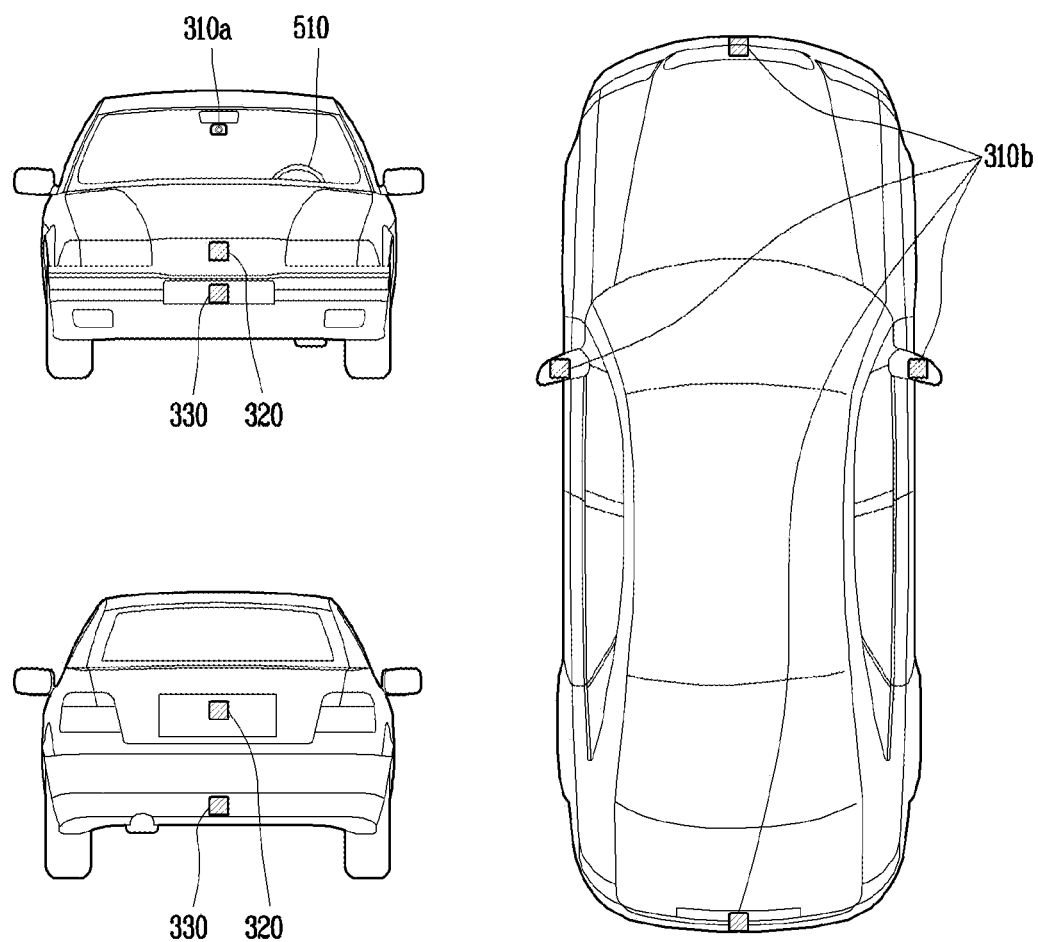
FIG. 2 is a view of a vehicle according to an embodiment of the present invention, which is seen from the outside at various angles.

FIG. 2 is a view illustrating appearance of a vehicle at various angles in accordance with an embodiment of the present invention.

Figure 3:
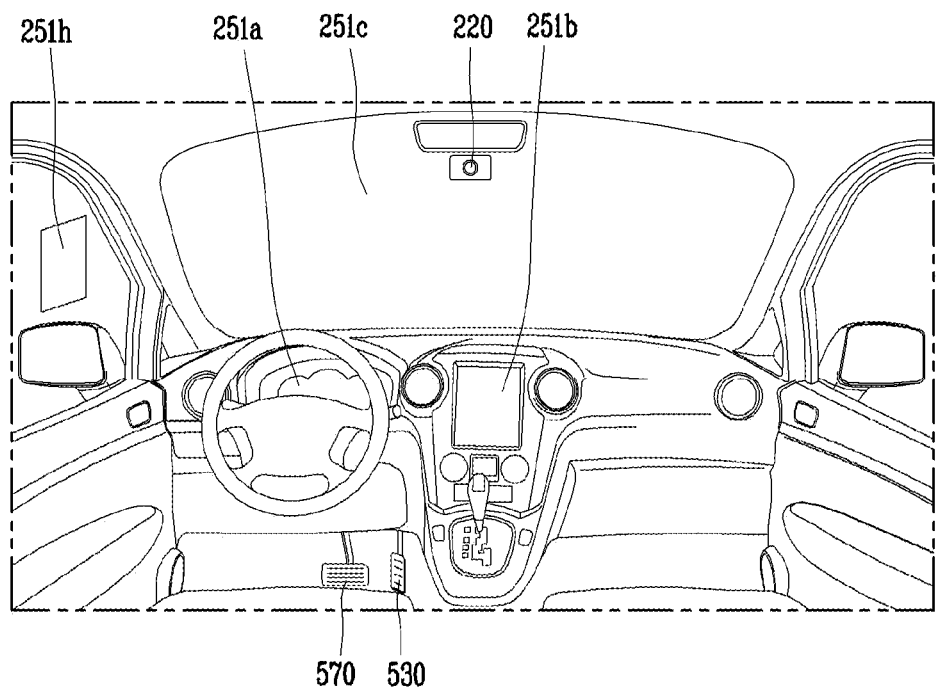
FIGS. 3 and 4 are views showing the inside of a vehicle according to an embodiment of the present invention.
Figure 4:
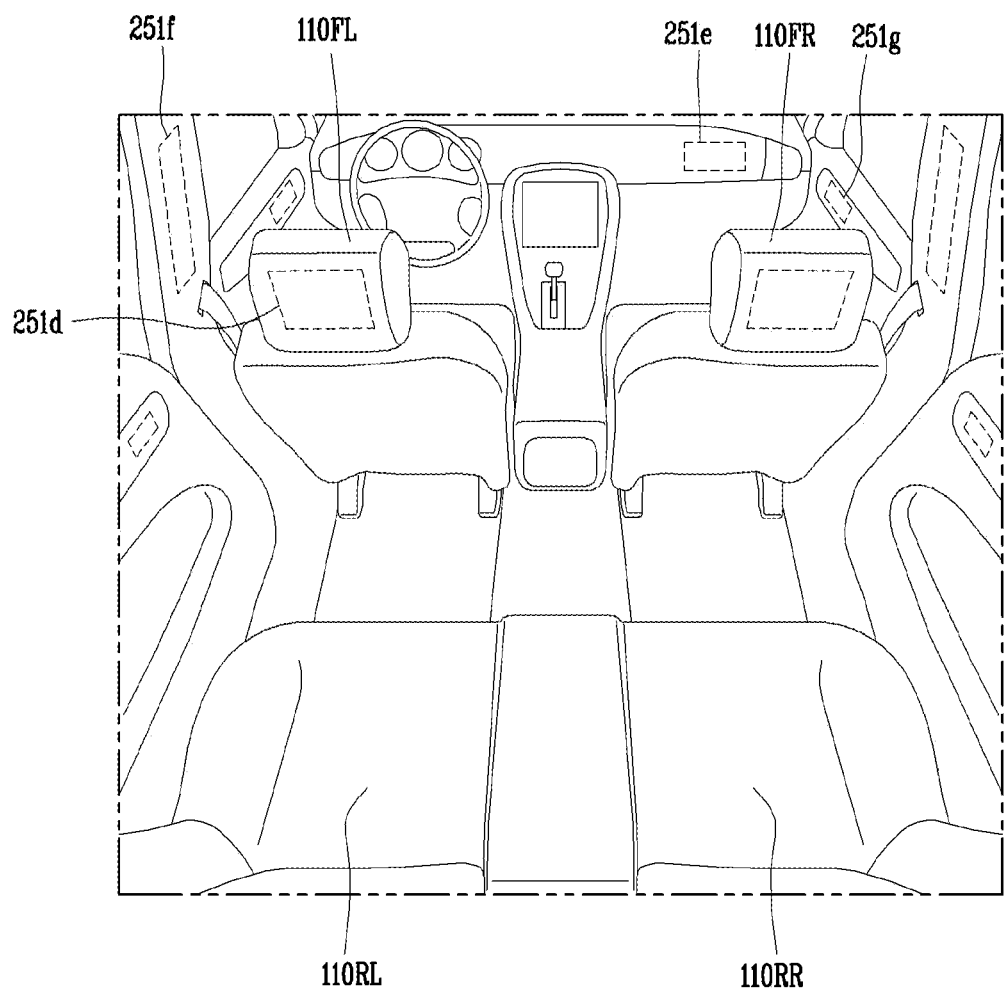

FIGS. 3 and 4 are views illustrating an inside of a vehicle in accordance with an embodiment of the present invention.

Figure 5:
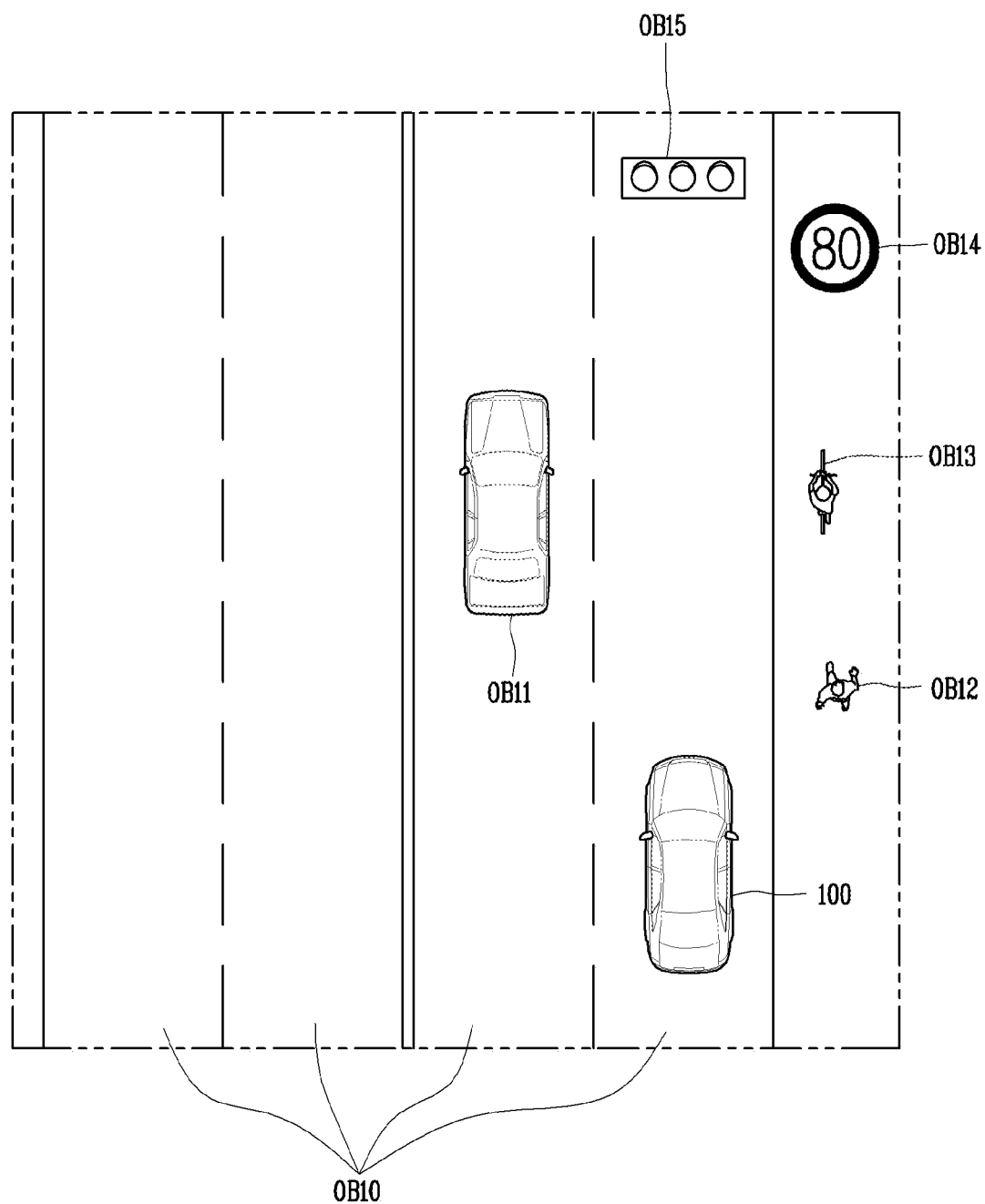
FIGS. 5 and 6 are views for explaining an object according to an embodiment of the present invention.
Figure 6:
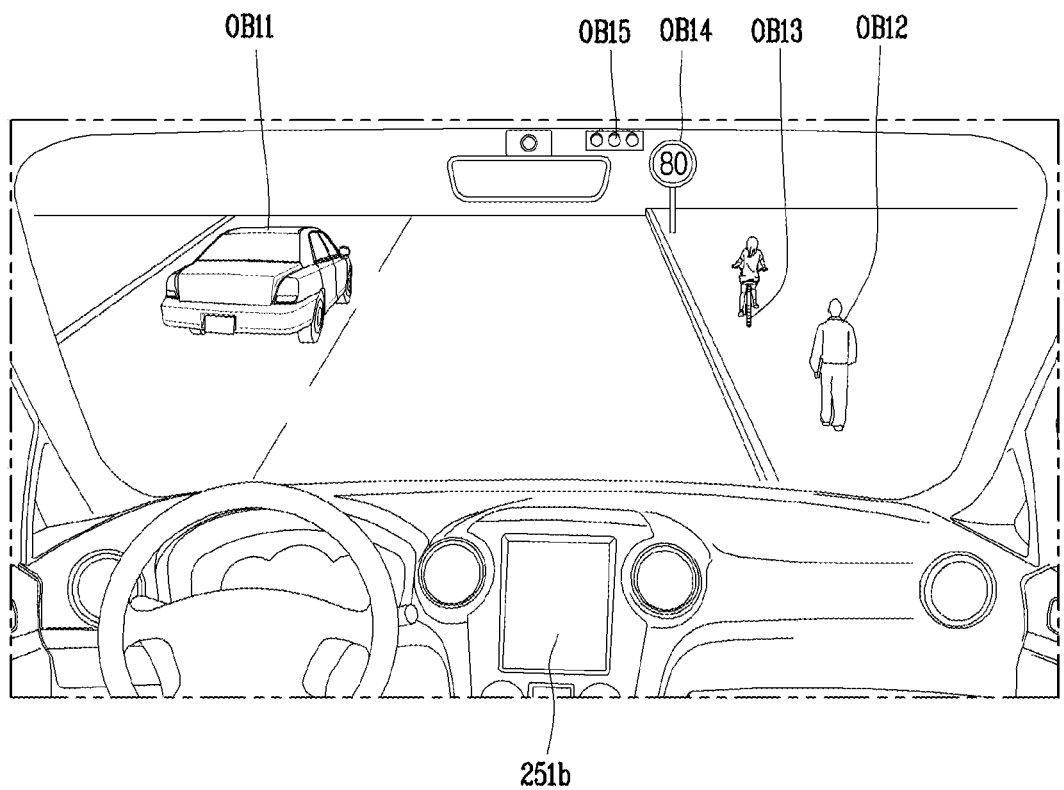

FIGS. 5 and 6 are reference views illustrating objects in accordance with an embodiment of the present invention.

Figure 7:
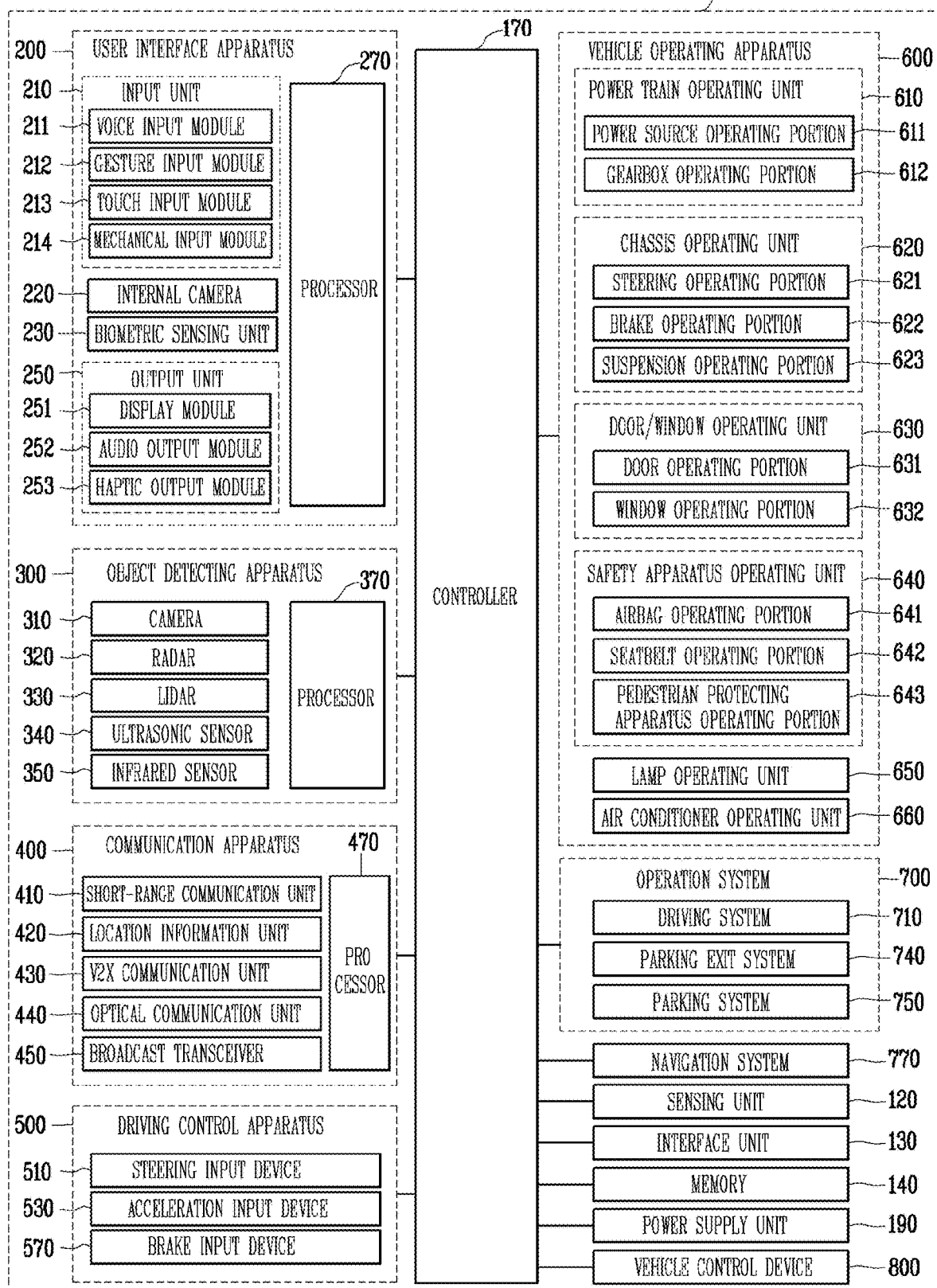
FIG. 7 is a block diagram for explaining a vehicle according to an embodiment of the present invention.

FIG. 7 is a block diagram illustrating a vehicle in accordance with an embodiment of the present invention.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

Here, the autonomous driving is defined as controlling at least one of acceleration, deceleration, and driving direction based on a preset algorithm. In other words, the autonomous driving refers to that a driving control apparatus is automatically manipulated even without a user input applied to the driving control apparatus.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 200 may be analyzed by the processor 270 and processed as a user's control command.

The input unit 200 may be disposed inside the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 200 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle (transportation facility) that is located near the vehicle 100 and moves using two wheels. The two-wheeled vehicle OB12 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server. The communication device 400 may be referred to as a 'wireless communication unit'.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Hereinafter, a vehicle controlling apparatus 800 provided at the vehicle 100 will be explained in more detail.

The vehicle controlling apparatus 800 is provided at the vehicle 100, which may be an independent apparatus formed to be detachable from the vehicle 100. Alternatively, the vehicle controlling apparatus 800 may be installed so as to be integral with the vehicle 100, as a component of the vehicle 100.

Hereinafter, for the sake of the convenience of explanations, it is assumed that the vehicle controlling apparatus 800 is a separate component from the controller 170 of the vehicle 100. However, this is merely exemplary. Operations and a control method of the vehicle controlling apparatus 800 in this specification may be performed by the controller 170 of the vehicle 100. That is, the operations and/or the control method performed by a processor 830 of the vehicle controlling apparatus 800 may be performed by the controller 170 of the vehicle 100.

Figure 8:
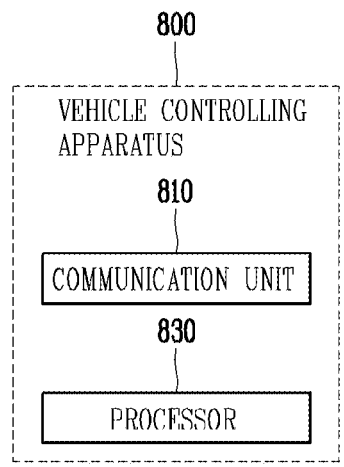
FIG. 8 is a conceptual view for explaining a vehicle controlling apparatus according to an embodiment of the present invention.

FIG. 8 is a conceptual view for explaining a vehicle controlling apparatus according to an embodiment of the present invention.

Referring to FIG. 8, the vehicle controlling apparatus 800 includes a communication unit 810 and a processor 830.

The communication unit 810 is configured to perform communication with various components shown in FIG. 7. For instance, the communication unit 810 may receive various types of information provided through a controller are network (CAN). As another example, the communication unit 810 may perform communication with all communicable devices such as a vehicle, a mobile terminal, a server and other vehicle. This may be referred to as a vehicle to everything (V2X) communication. The V2X communication may be defined as a technology to exchange or share information such as a traffic situation by communicating with other vehicle while driving, based on a road infrastructure.

The communication unit 810 is configured to perform communication with one or more devices provided at the vehicle 100.

Further, the communication unit 810 may receive information related to a vehicle's driving, from most of devices provided at the vehicle 100. Information transmitted from the vehicle 100 to the vehicle controlling apparatus 800 is referred to as 'vehicle driving information'.

The vehicle driving information includes vehicle information and peripheral information. Based on a frame of the vehicle 100, information related to the inside of the vehicle may be defined as vehicle information, and information related to the outside of the vehicle may be defined as peripheral information.

The vehicle information means information about the vehicle itself. For instance, the vehicle information may include a driving speed, a driving direction, an acceleration, an angular speed, a position (GPS), a weight, the number of passengers inside the vehicle, a braking force of the vehicle, a maximum braking force of the vehicle, an air pressure of each wheel, a centrifugal force applied to the vehicle, a driving mode of the vehicle (autonomous driving mode or hand-operated driving mode), a parking mode of the vehicle (autonomous parking mode, automatic parking mode, hand-operated parking mode), whether a user is in the vehicle or not, information about the user, etc.

The peripheral information means information about an object positioned within a predetermined range on the basis of the vehicle, and information related to the outside of the vehicle. For instance, the peripheral information may be a state (frictional force) of a road surface on which the vehicle is moving, the weather, a distance from a front (or rear) vehicle, a relative speed of a front (or rear) vehicle, a curvature of a curve in a case that a road on which the vehicle is moving is curved, a peripheral brightness of the vehicle, information related to an object which is positioned within a reference region (predetermined region) on the basis of the vehicle, whether an object enters/is out of the predetermined region, whether a user is near the vehicle, information about the user (e.g., whether the user is an authenticated user or not), etc.

Further, the peripheral information may include a peripheral brightness, a temperature, a sun's position, information about a nearby object (man, other vehicle, sign, etc.), a type of a road surface on which the vehicle is moving, a landmark, line information, lane information, and information required for autonomous driving/autonomous parking/automatic parking/hand-operated parking mode.

Further, the peripheral information may include a distance from the vehicle 100 to an object which exists near the vehicle, a collision probability, a type of the object, an allowable parking space of the vehicle, an object for recognizing a parking space (e.g., a parking line, a string, other vehicle, a wall, etc.), etc.

The vehicle driving information is not limited to the aforementioned information, but may include all information generated from the components of the vehicle 100.

The processor 830 is configured to control one or more devices provided at the vehicle 100 by using the communication unit 810.

More specifically, the processor 830 may determine whether at least one of a plurality of preset conditions is satisfied, based on vehicle driving information received through the communication unit 810. The processor 830 may control the one or more displays differently according to a satisfied condition.

The processor 830 may sense an event occurrence from electronic equipment and/or an application provided at the vehicle 100 in association with a preset condition, and may determine whether the sensed event satisfies the preset condition. Here, the processor 830 may sense an event occurrence from information received through the communication unit 810.

The application is a concept including a widget or a home launcher, etc., and means all types of programs which can be activated at the vehicle 100. Thus, the application may be a program to perform a web browsing, a video play, a message transmission/reception, a schedule management, and an application update.

Further, the application may include at least one of a Forward Collision Warning (FCW), a Blind Spot Detection (BSD), a Lane Departure Warning (LDW), a Pedestrian Detection (PD), a Curve Speed Warning (CSW) and a Turn By Turn navigation (TBT).

For instance, if there is a missed call, an application to be updated, or a received message, an event occurrence may be a start on, a start off, an autonomous driving on/off, an LCD awake key, an alarm, an incoming call, a missed notification, etc.

As another example, the event occurrence may be the occurrence of a warning preset to an advanced driver assistance system (ADAS), or a case where a function preset to the ADAS is performed. For instance, the event occurrence may be the occurrence of a forward collision warning, the occurrence of a blind spot detection, the occurrence of a lane departure warning, the occurrence of a lane keeping assist warning, and a case where an autonomous emergency braking is performed.

As still another example, an event occurrence may be determined when a forward gear is changed into a backward gear, when an acceleration larger than a predetermined value is generated, when a deceleration larger than a predetermined value is generated, when a power system is changed into a motor from an internal combustion engine, or when a power system is changed into an internal combustion engine from a motor.

Also, an event occurrence may be determined when various ECUs provided at the vehicle 100 perform specific functions.

When an occurred event satisfies a preset condition, the processor 830 controls the communication unit 810 so that information corresponding to the preset condition is displayed on the one or more displays.

The processor 830 may transmit an autonomous driving message to at least one of a plurality of devices provided at the vehicle 100, so that the vehicle 100 performs an autonomous driving. For instance, the processor 830 may transmit an autonomous driving message to a brake for deceleration, or may transmit an autonomous driving message to a steering device for change of a driving direction.

Hereinafter, the operation of the vehicle controlling apparatus 800 will be explained in more detail with reference to the attached drawings.

The vehicle controlling apparatus 800 controls one or more displays mounted to the vehicle 100. As an autonomous driving is developed, the vehicle 100 is not provided with a user input device for a vehicle control, such as a steering wheel. Rather, a large-screen display may be arranged at the corresponding space. Further, seats fixed in the vehicle 100 may be formed to be freely moveable, and may have various seat positions.

Accordingly, it is required to display various information on the large-screen display dynamically in an optimized manner to a user, not statically. For instance, a display region for displaying visual information needs to be changed dynamically with consideration of a user's sight line range.

Generally, a viewing angle where visual information can be checked when a user views the front side is 15° on the right and left sides, respectively (total 30°). And a viewing angle where an immediate reaction can be performed is 35° on the right and left sides, respectively (total 70°).

A region where a user can check visual information is decreased when a distance between a display and the user is short, but is increased when the distance between the display and the user is long. Using this characteristic, the vehicle controlling apparatus of the present invention provides a customized user interface considering a passenger's sight line range.

Figure 9:
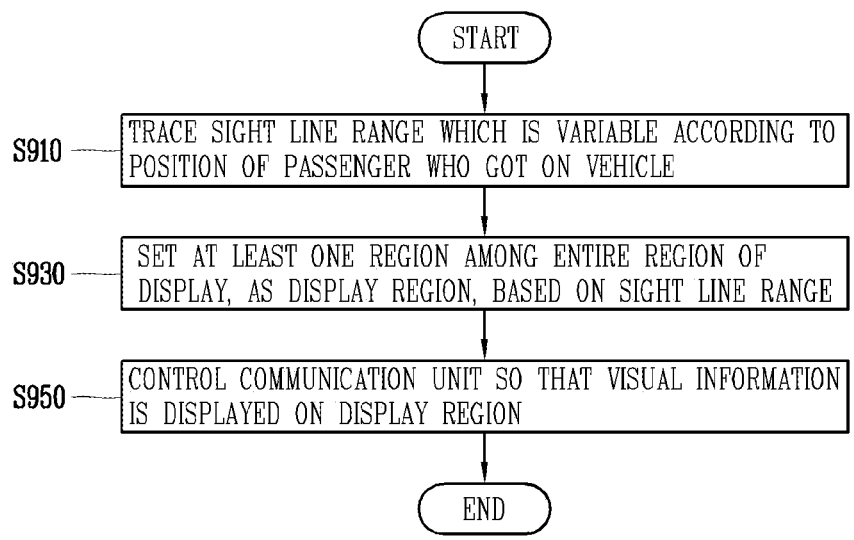
FIG. 9 is a flowchart for explaining a control method by the vehicle controlling apparatus of FIG. 8.

FIG. 9 is a flowchart for explaining a control method by the vehicle controlling apparatus of FIG. 8, and FIGS. 10A to 10C are exemplary views for explaining operations by the control method of FIG. 9.

The processor 830 traces a sight line range which is variable according to a position of a passenger who got on the vehicle (S910).

The processor 830 receives various types of information through the communication unit 810. For instance, the information may include at least one of a passenger's image captured by a camera provided in the vehicle 100, a passenger's sight line direction traced by the passenger's image, a reference point of a sight line direction, and a position of a passenger's seat.

The processor 830 may trace a sight line range which is variable according to a passenger's position, based on various types of information received through the communication unit 810.

The sight line range is defined based on a sight line direction, a reference point for the sight line direction, and a reference angle. More specifically, the reference point is defined based on a passenger's position, and the sight line direction is defined based on the reference point. And the sight line range is defined as a range within a predetermined angle on the right and left sides, respectively, based on the reference point and the sight line direction. For instance, the sight line range may be determined by at least one of a passenger's head position, a passenger's face direction, and a passenger's sight line.

The processor 830 sets at least one region among an entire region of the display, as a display region, based on the sight line range (S930).

At least one of a size and a position of the display region may be differently set according to the sight line range. For instance, the processor 830 may set an overlapped region between the sight line range and the display 251, as a first display region (1st DA) shown in FIG. 10A or a second display region (2nd DA) shown in FIG. 10B.

Even if a passenger views the same direction, the display region may be changed according to a seat position of the passenger. The reason is because a distance (d1 or d2) between the display 251 and the passenger is changed, and an overlapped region between the sight line range and the display is changed, if the reference point is changed.

The display region is real-time changed according to the sight line range.

The processor 830 controls the communication unit 810 so that visual information is displayed on the display region (S950).

The processor 830 determines information to be output to the display region, based on at least one of a size and a position of the display region. That is, information to be output to the display region may be variable according to the display region.

Figure 10A:
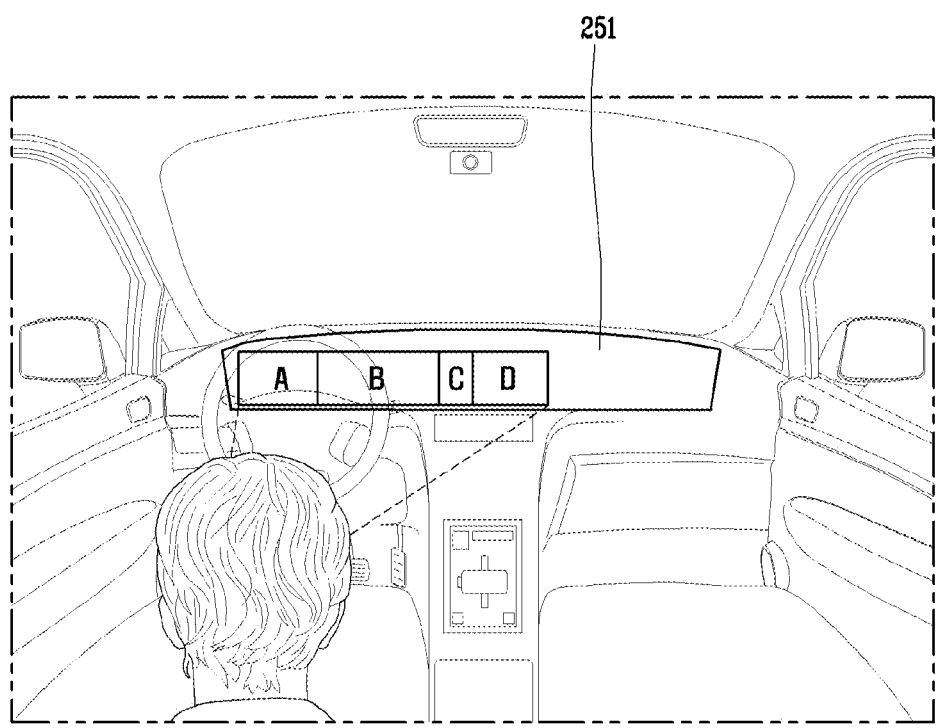
FIGS. 10A to 10C are exemplary views for explaining operations by the control method of FIG. 9.
Figure 10A:
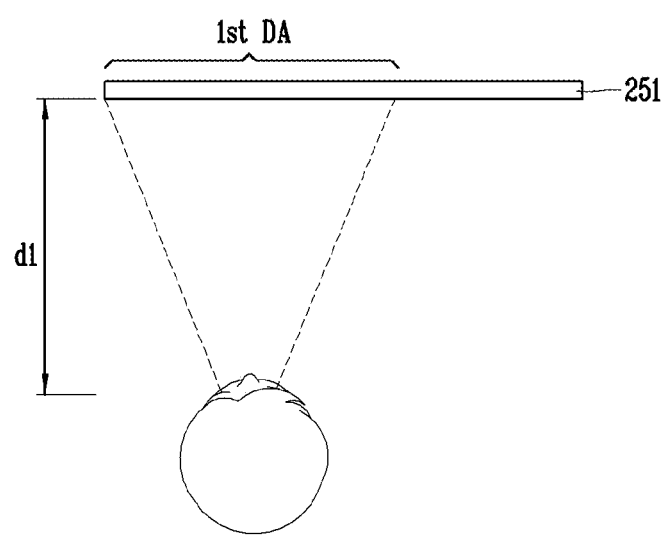
Figure 10B:
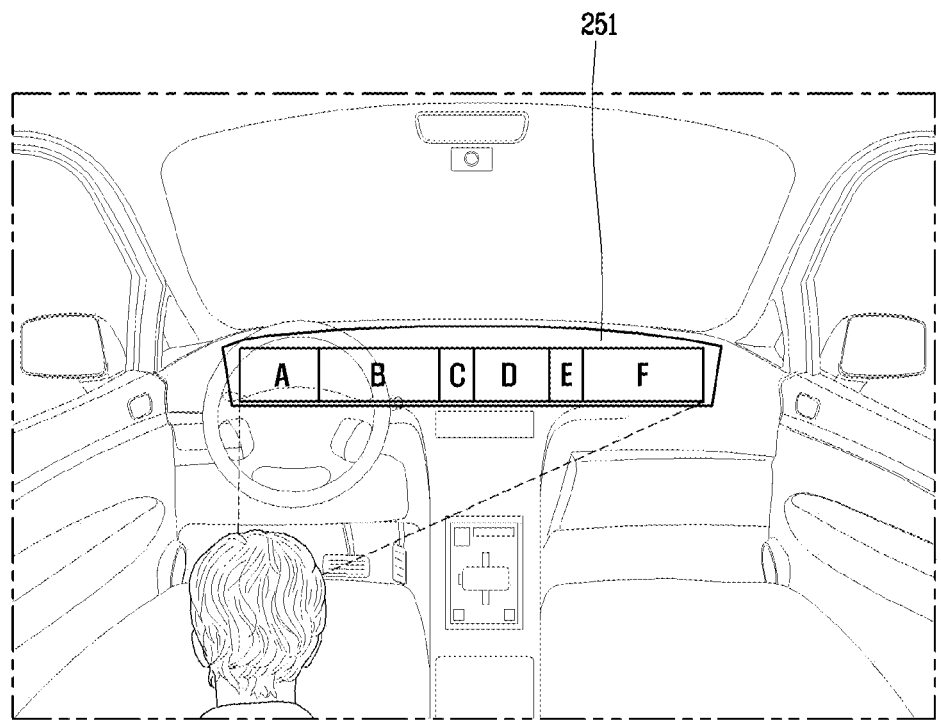
Figure 10B:
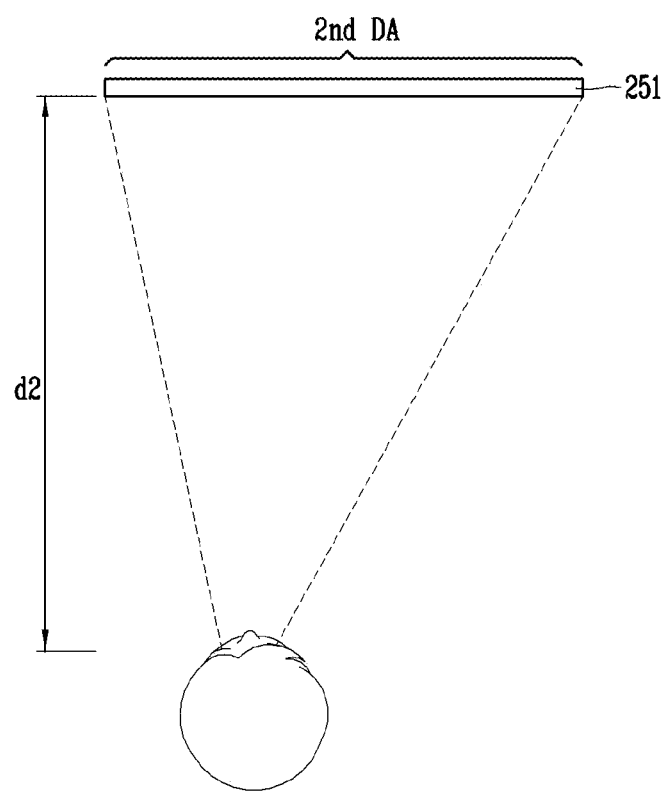
Figure 10C:
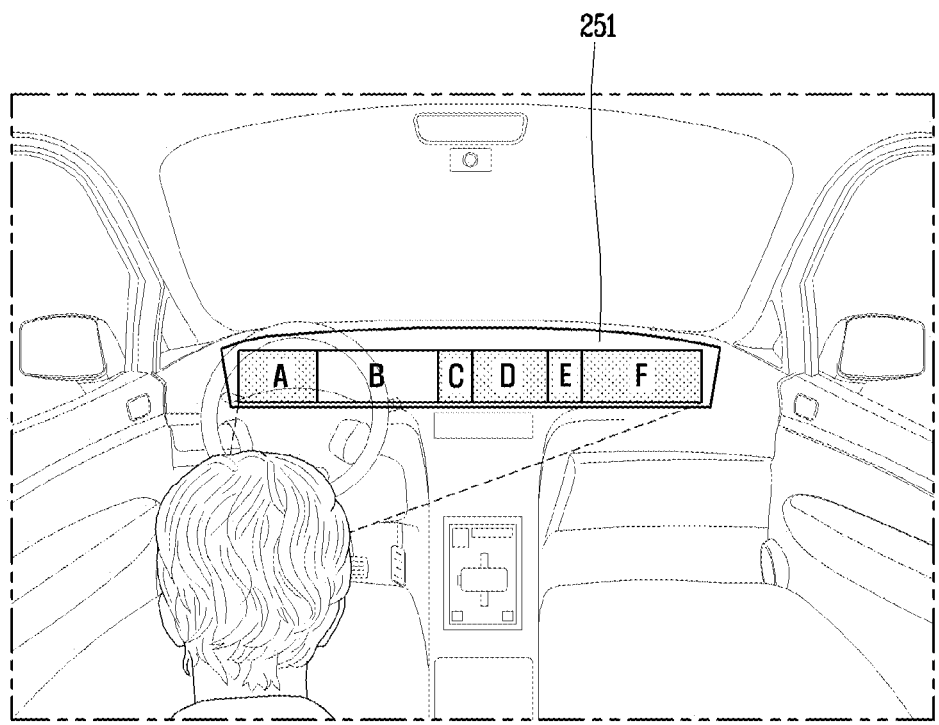

The processor 830 may determine the number of contents to be displayed on the display region based on the sight line range, and may control the communication unit 810 so that the determined number of contents are displayed on the display region. For instance, four contents (A-D) may be displayed on the first display region (1st DA) as shown in FIG. 10A, and six contents (A-F) may be displayed on the second display region (2nd DA) as shown in FIG. 10B. As the distance between the passenger and the display 251 becomes long, the display region becomes large. Thus, the number of contents to be displayed on the display region may be increased.

Each content may be displayed as a single screen which is physically separated. For instance, four contents may be displayed as four screens separated from each other.

A plurality of screens separated from each other may be displayed on the display region, and the processor 830 may select one screen as a main screen based on the passenger's sight line. Then, the processor 830 may perform a predetermined function with respect to the main screen.

For instance, as shown in FIG. 11C, the processor 830 may determine 'B' screen as a main screen based on the passenger's sight line, and may control the communication unit 810 to perform a local dimming for making the 'B' screen brighter than other screens.

As another example, the processor 830 may determine a maximum size of the main screen by considering the plurality of screens, and may control the communication unit 810 so that the main screen is enlarged to the maximum size. If four screens are displayed on the display region, one screen may be determined as the main screen, and the remaining screens may be minimized. The main screen is displayed on the minimized remaining regions, in a maximum size. The maximum size may be changed according to the distance between the passenger and the display 251.

As still another example, the processor 830 may determine at least one of a display position and a display size of each screen, based on a priority of said each screen. The processor 830 may update the priority of each screen based on the passenger's sight line.

The plurality of screens are sequentially arranged on the display region from one end towards another end, in order of a higher priority. Here, the one end may be variable according to the passenger's position.

For instance, if the passenger is on a driver's seat, the one end may be set as a left end of the display which the passenger views. On the contrary, if the passenger is on a passenger's seat, said another end may be set as a right end of the display which the passenger views. This is to provide a screen of a higher priority to the passenger, based on the passenger's sight line.

The processor 830 may control the communication unit 810 so that visual information is not displayed on the remaining region except for the display region, among the entire region of the display. For instance, the display region may be turned on, and the remaining region may be turned off. As visual information is not displayed on the remaining region which is not used by the passenger, unnecessary power waste is prevented.

Even if a plurality of contents are displayed on a large screen, a user can view only one content in a concentrated manner. The vehicle controlling apparatus 800 provides an environment where a passenger can concentrate more on a content which the passenger views. For instance, other screens may be processed to be dark so that the passenger concentrates on the main screen. As another example, the main screen may be displayed in a maximum size within a viewing angle range, and the remaining contents may be displayed in a compressed manner. As the passenger's sight line is moved, a position of a local dimming is also changed.

Figure 11:
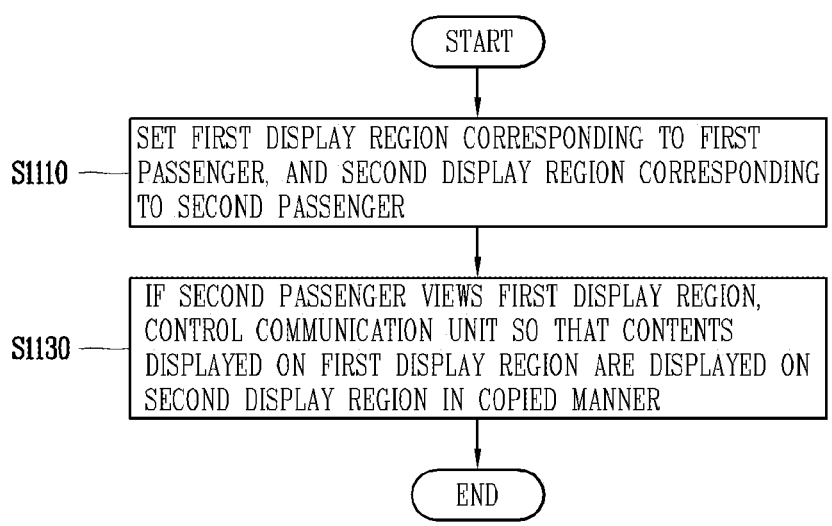
FIG. 11 is a flowchart for explaining a control method by a vehicle controlling apparatus, in a case that a plurality of passengers got on a vehicle.

FIG. 11 is a flowchart for explaining a control method by the vehicle controlling apparatus, in a case that a plurality of passengers get on the vehicle. And FIGS. 12A and 12B are exemplary views for explaining the control method of FIG. 11.

The processor 830 may set a first display region corresponding to a first passenger, and a second display region corresponding to a second passenger (S1110).

More specifically, the processor 830 traces a sight line range of a first passenger 1210 (hereinafter, will be referred to as 'first sight line range'), and a sight line range of a second passenger 1220 (hereinafter, will be referred to as 'second sight line range'). Then, the processor 830 sets a first display region corresponding to the first sight line range, and a second display region corresponding to the second sight line range.

Figure 12A:
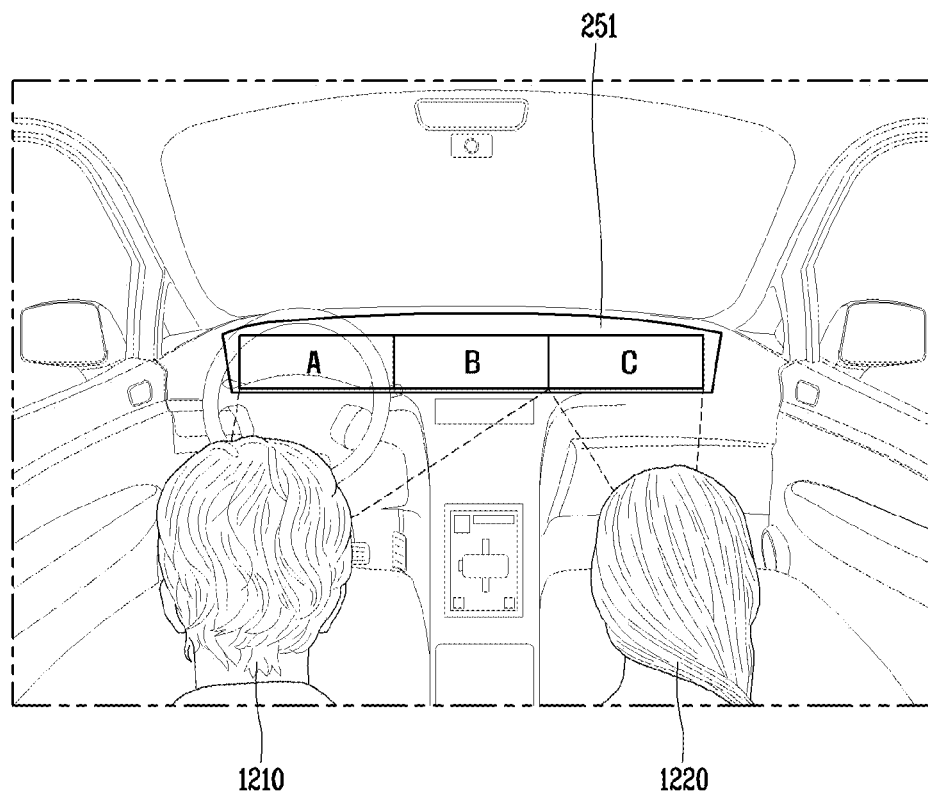
FIGS. 12A and 12B are exemplary views for explaining the control method of FIG. 11.
Figure 12B:
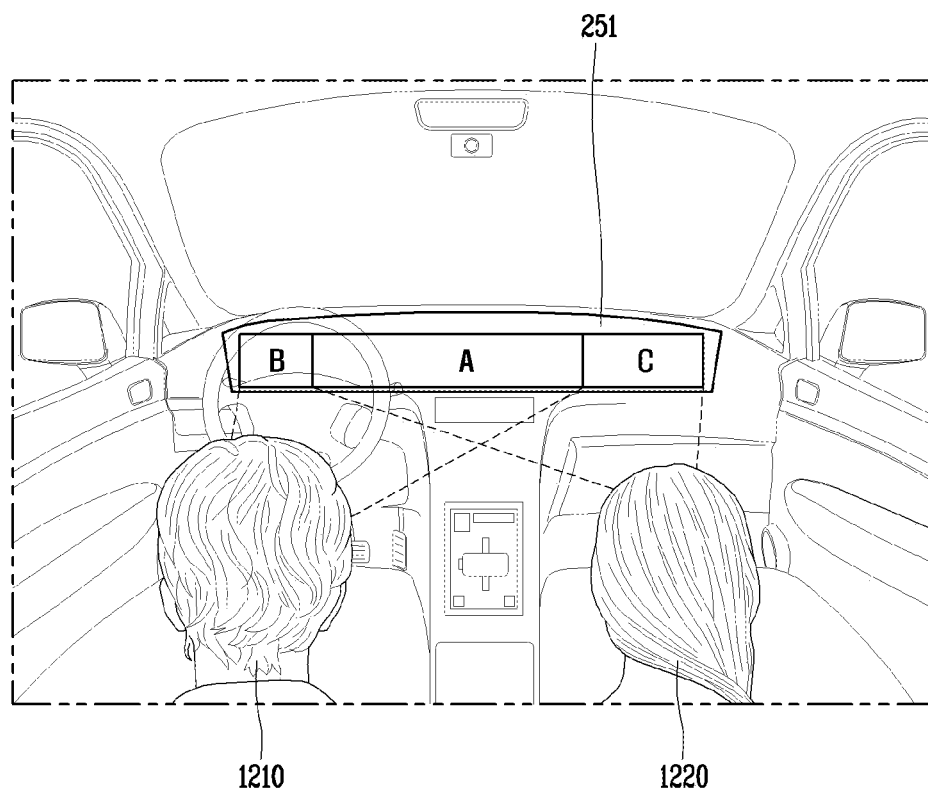

For instance, as shown in FIG. 12A, 'A' screen and 'B' screen may be displayed on the first display region, and 'C' screen may be displayed on the second display region.

The first and second display regions may be overlapped with each other at least partially. On the overlapped region, sharing information of the first passenger and the second passenger may be displayed. The sharing information may include at least one of a current time, a current position on a map, a destination, and a path to a destination.

If the first and second display regions are not overlapped with each other, the sharing information may be displayed on an edge part of the first display region and an edge part of the second display region, respectively. However, if the first and second display regions are overlapped with each other, the sharing information is moved to be displayed on the overlapped region.

If the second passenger views the first display region, the processor 830 may control the communication unit so that contents displayed on the first display region are displayed on the second display region in a copied manner (S1130).

More specifically, if the second passenger views the first display region for the first passenger, the processor 830 may select one of screens displayed on the first display region, based on the second passenger's sight line.

As the second passenger's sight line is towards the first display region, the sight line range is changed, and the first and second display regions are overlapped with each other. The processor 830 may move the selected screen to the overlapped region, thereby efficiently utilizing the display 251 having a physical size limitation. For instance, as shown in FIG. 12B, the processor 830 may select 'A' screen based on the sight line of the second passenger 1220, and may display the 'A' screen on the overlapped region of the first and second display regions.

Figure 13A:
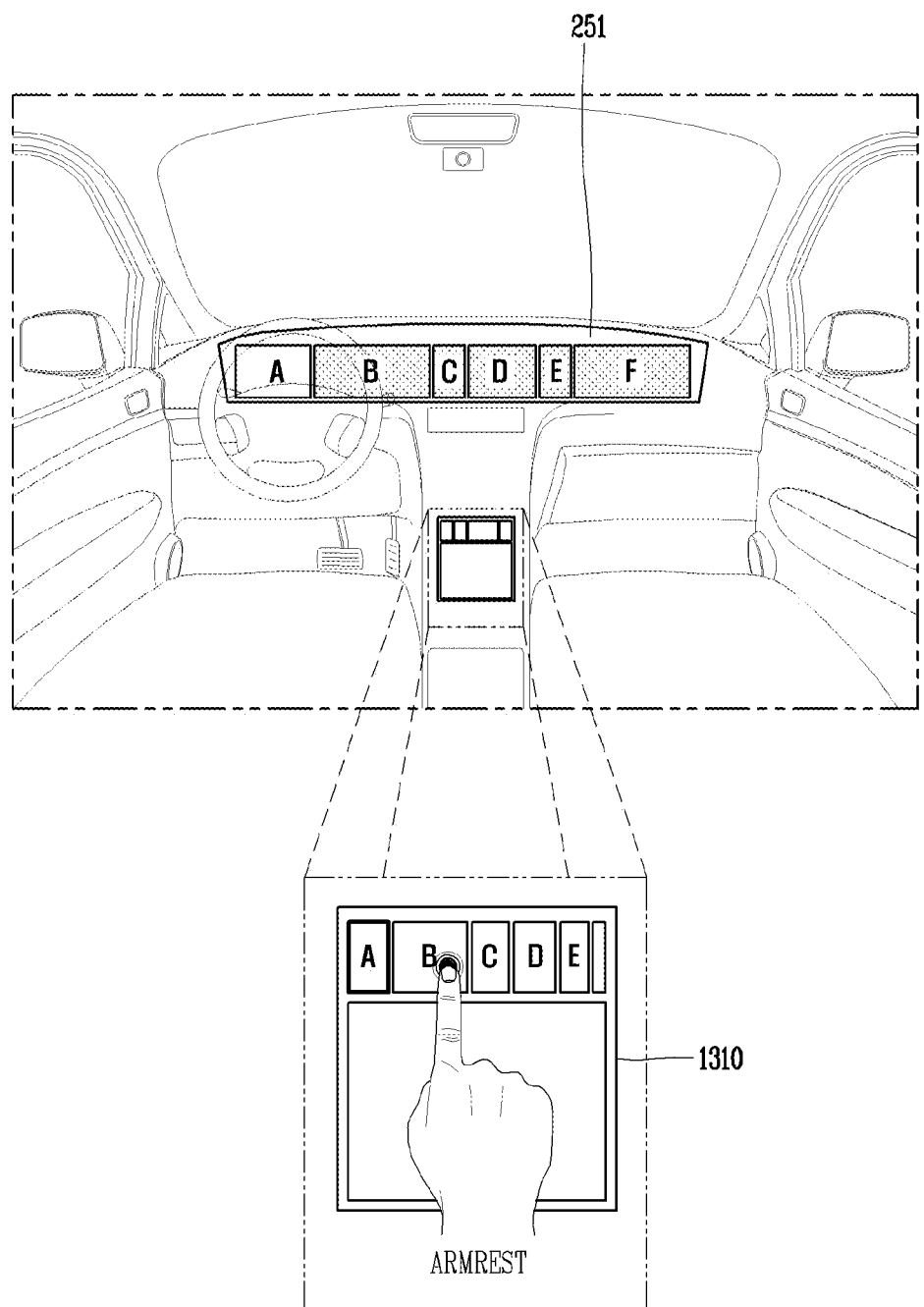
FIGS. 13A and 13B are exemplary views for explaining a method for emphasizing a main screen.
Figure 13B:
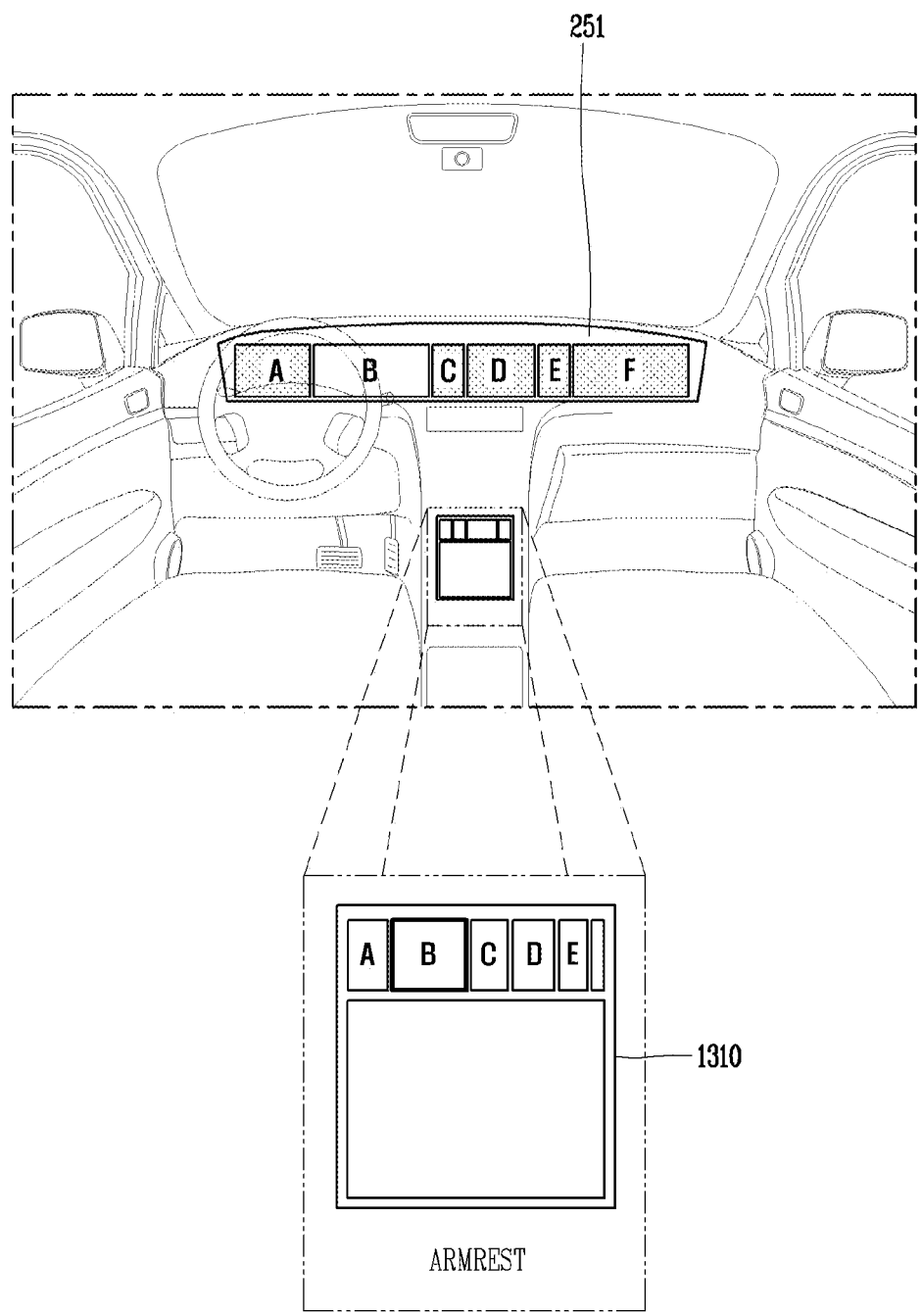

FIGS. 13A and 13B are exemplary views for explaining a method for emphasizing a main screen.

The processor 830 may select one screen as a main screen based on a passenger's sight line, and may control the communication unit 810 to perform a local dimming for making the main screen brighter than other screens.

For instance, as shown in FIG. 13A, if 'A' screen is the main screen, the 'A' screen may have a first brightness, and other screens (B-F) may have a second brightness darker than the first brightness. As shown in FIG. 13B, the main screen may be changed to the 'B' screen from the 'A' screen, according to a passenger's sight line or a passenger's request. As a result, the brightness of the 'A' screen is changed to the second brightness from the first brightness, and the brightness of the 'B' screen is changed to the first brightness from the second brightness.

A sub display may be mounted to the vehicle 100, on an armrest between a driver's seat and a passenger's seat. The sub display 1310 is configured to receive a user's input for controlling the display 251, and may display guide information for guiding screens displayed on the display 251.

A passenger's request to select a specific screen as a main screen may be received through the sub display 1310. For instance, the guide information may include a graphic object corresponding to each screen. 'A' graphic object corresponding to the 'A' screen, 'B' graphic object corresponding to the 'B' screen, etc. may be included in the guide information. A passenger may select the 'B' screen as a main screen by applying a touch input to the 'B' graphic object. Further, a user may apply various touch inputs to each graphic object, thereby executing various functions related to a corresponding screen.

Figure 14:
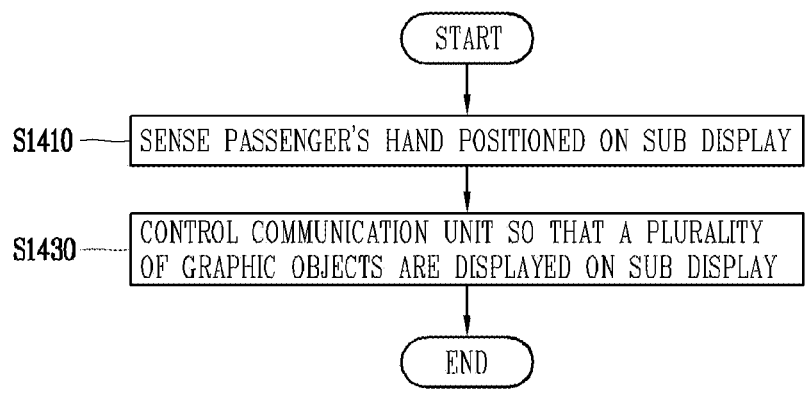
FIG. 14 is a flowchart for explaining a method for controlling a display, based on a user input applied to a sub display provided at a vehicle.
Figure 15:
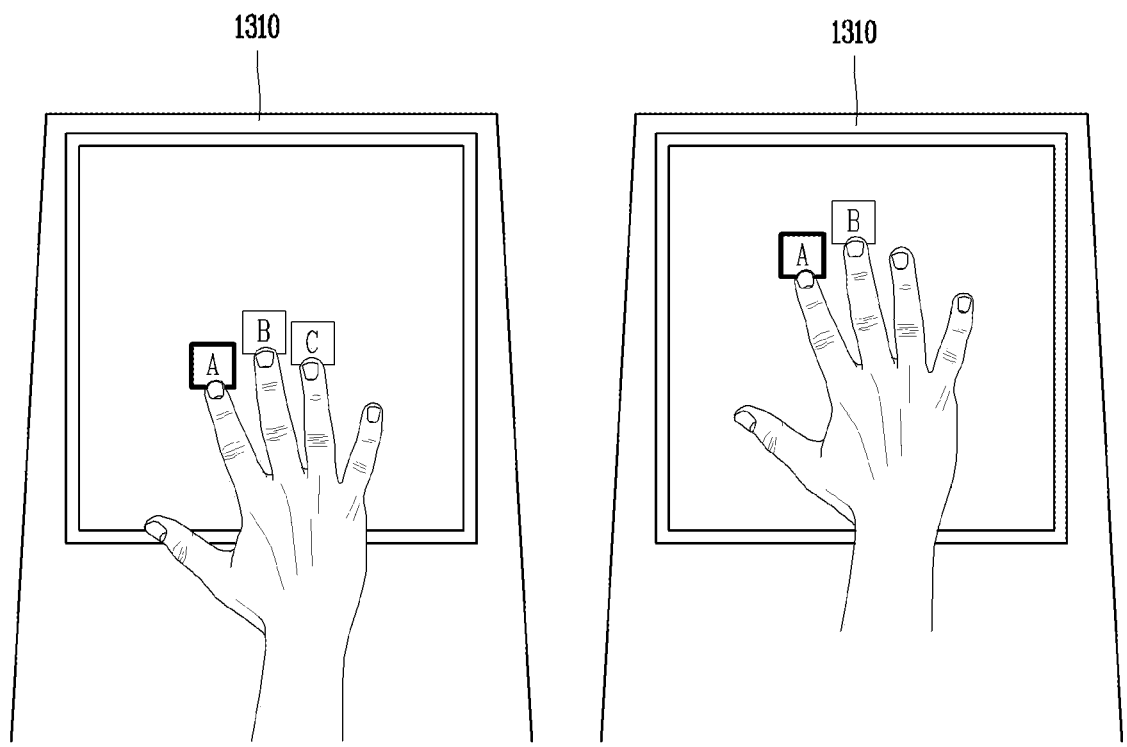
FIG. 15 is an exemplary view for explaining the method of FIG. 14.

FIG. 14 is a flowchart for explaining a method for controlling the display, based on a user input applied to the sub display provided at the vehicle. And FIG. 15 is an exemplary view for explaining the method of FIG. 14.

The processor 830 may sense a passenger's hand positioned on the sub display 1310 (S1410). And the processor 830 may control the communication unit 810 so that a plurality of graphic objects are displayed on the sub display 1310 (S1430).

In response to the passenger's hand positioned on the sub display 1310, the processor 830 controls the communication unit 810 so that a plurality of graphic objects are displayed on the sub display 1310. A graphic object corresponding to the main screen, among the plurality of graphic objects, may be highlighted.

A display position of the graphic objects is changed according to a position of the hand. More specifically, the processor 830 controls the communication unit 810 so that a first graphic object is displayed on a region where the passenger's index finger is positioned, and a second graphic object is displayed on a region where the passenger's middle finger is positioned, among the entire region of the sub display 1310.

If three screens are displayed on a display region, first to third graphic objects are displayed. If four screens are displayed on the display region, first to fourth graphic objects are displayed. Here, the third graphic object is displayed on a region where the ring finger is positioned, and the fourth graphic object is displayed on a region where the little finger is positioned.

Since a display position of the graphic object is changed according to a passenger and a hand position, a user may rapidly select a desired graphic object by using his hand.

Here, the second graphic object may correspond to the main screen among a plurality of screens being output to the display region, and the first graphic object may be a screen adjacent to the left end of the main screen.

For instance, as shown in FIG. 14, while 'A-F' screens are being sequentially displayed from the left end of the display 251 towards the right end, the 'B' screen may be set as the main screen. In this case, the second graphic object may correspond to the 'B' screen, and the first graphic object may correspond to the 'A' screen. If the main screen is the 'C' screen, the second graphic object corresponds to the 'C' screen, and the first graphic object corresponds to the 'B' screen.

Even if a seat position is changed variously, a user may control the display by using the sub display positioned on the armrest. Here, the user has only to put his hand on the sub display so that a graphic object is displayed on an end region of each finger. Accordingly, the user may simply select a desired graphic object to be executed.

The present invention can be implemented as computer-readable codes (applications or software) in a programrecorded medium. The method of controlling the autonomous vehicle can be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A vehicle controlling apparatus for controlling a vehicle having a display, comprising:
   a communication unit configured to communicate with the display; and
   a processor configured to:
      set at least one region among an entire region of the display as a display region, based on a sight line range changed according to a position of a passenger in the vehicle, the passenger is a first passenger, and
      control the communication unit so that visual information is displayed on the display region,
   wherein the processor is further configured to:
      set a first display region corresponding to the first passenger, and a second display region corresponding to a second passenger,
      select, from among screens displayed on the first display region and based on the processor detecting that the second passenger views the first display region, a screen displayed on the first display region according to a sight line of the second passenger,
      based on the sight line of the second passenger moving toward the first display region, change the sight line range and set the first and second display regions to overlap with each other, and
      move the selected screen displayed on the first display region to the overlapped region.

2. The vehicle controlling apparatus of claim 1, wherein a plurality of screens spaced apart from each other are displayed on the display region, and
   wherein the processor is configured to select one screen as a main screen based on a sight line of the passenger, and execute a predetermined function with respect to the main screen.

3. The vehicle controlling apparatus of claim 2, wherein the processor controls the communication unit to perform a local dimming for making the main screen brighter than other screens.

4. The vehicle controlling apparatus of claim 2, wherein the processor is configured to determine a maximum size of the main screen by considering the plurality of screens, and controls the communication unit so that the main screen is enlarged to the maximum size.

5. The vehicle controlling apparatus of claim 4, wherein the maximum size is changed according to a distance between the passenger and the display.

6. The vehicle controlling apparatus of claim 2, wherein the processor is configured to determine at least one of a display position or a display size of each screen, based on a priority of said each screen.

7. The vehicle controlling apparatus of claim 6, wherein the processor is configured to update the priority of each screen based on the sight line of passenger.

8. The vehicle controlling apparatus of claim 6, wherein the plurality of screens are sequentially arranged on the display region from one end towards another end, in order of a higher priority.

9. The vehicle controlling apparatus of claim 8, wherein the one end is variable according to a position of the passenger.

10. The vehicle controlling apparatus of claim 1, wherein the sight line range is determined by at least one of a head position, a face direction, or a sight line of the passenger.

11. The vehicle controlling apparatus of claim 1, wherein the processor is configured to determine a number of contents to be displayed on the display region based on the sight line range, and controls the communication unit so that the determined number of contents are displayed on the display region.

12. The vehicle controlling apparatus of claim 11, wherein the number of contents to be displayed on the display region is increased based on a distance between the passenger and the display being greater than a predetermined distance.

13. The vehicle controlling apparatus of claim 1, wherein the processor controls the communication unit so that visual information is not displayed on a remaining region except for the display region, among the entire region of the display.

14. The vehicle controlling apparatus of claim 13, wherein the display region is turned on, and the remaining region is turned off.

15. The vehicle controlling apparatus of claim 1, wherein the display region is real-time changed according to the sight line range.

16. The vehicle controlling apparatus of claim 1, wherein a sub display configured to receive a user's input for controlling the display is further provided at the vehicle, and
   wherein in response to the passenger's hand positioned on the sub display, the processor controls the communication unit so that a plurality of graphic objects are displayed on the sub display.

17. The vehicle controlling apparatus of claim 16, wherein a display position of the graphic objects is changed according to a position of the hand.

18. The vehicle controlling apparatus of claim 17, wherein the processor controls the communication unit so that a first graphic object is displayed on a region where the passenger's index finger is positioned, and a second graphic object is displayed on a region where the passenger's middle finger is positioned, among an entire region of the sub display.

* * * * *